May 23, 1967  H. A. CARLSON  3,321,194
CARBURETOR
Filed April 10, 1964  4 Sheets-Sheet 2

INVENTOR.
HAROLD A. CARLSON
BY

AGENT

May 23, 1967  H. A. CARLSON  3,321,194
CARBURETOR
Filed April 10, 1964  4 Sheets-Sheet 3
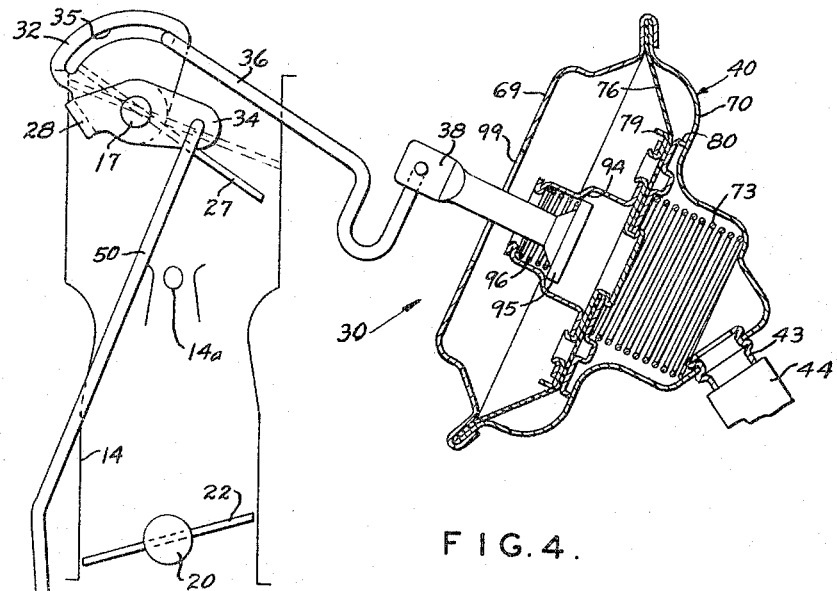
FIG. 4.
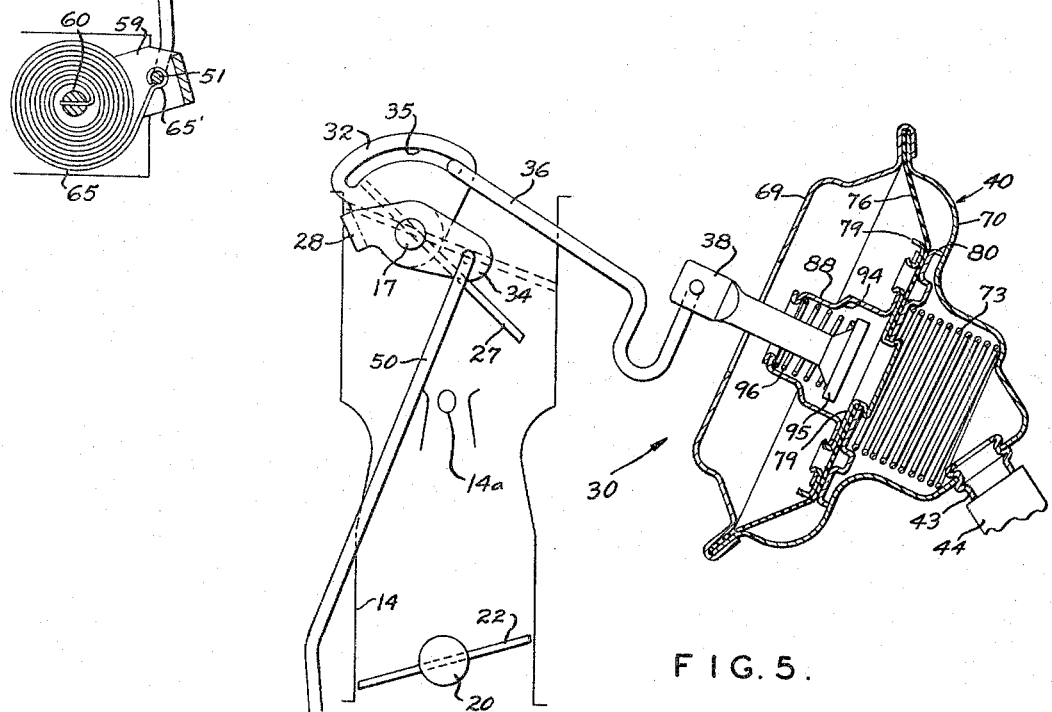
FIG. 5.
INVENTOR.
HAROLD A. CARLSON
BY
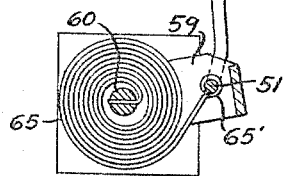
AGENT May 23, 1967  H. A. CARLSON  3,321,194
CARBURETOR
Filed April 10, 1964  4 Sheets-Sheet 4
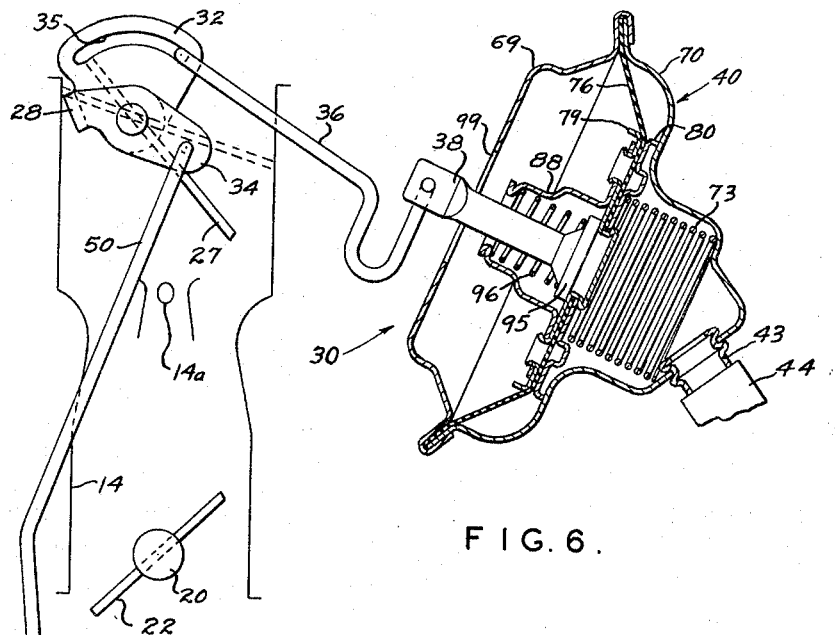
FIG. 6.
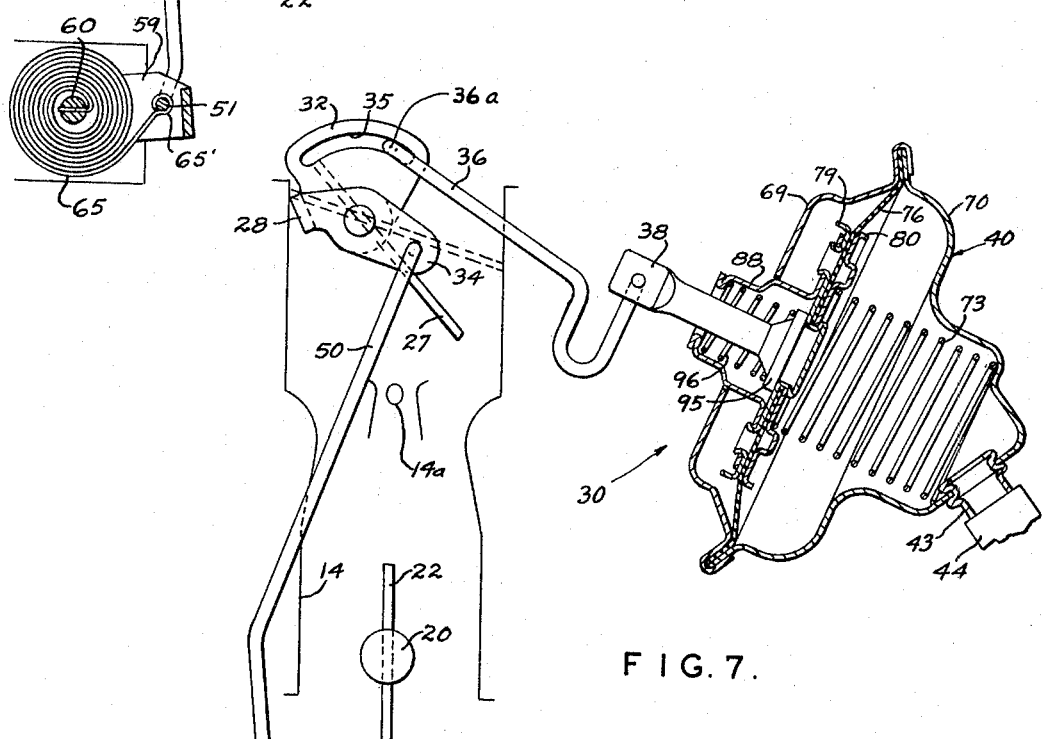
FIG. 7.
INVENTOR.
HAROLD A. CARLSON
BY 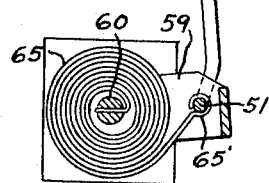
AGENT

United States Patent Office 3,321,194
Patented May 23, 1967

3,321,194
CARBURETOR
Harold A. Carlson, Brentwood, Mo., assignor to ACF Industries, Incorporated, New York, N.Y., a corporation of New Jersey
Filed Apr. 10, 1964, Ser. No. 358,754
3 Claims. (Cl. 261—39)

This invention relates to an automatic choke mechanism for a carburetor, and particularly to a power operator applicable to the various types of automatic chokes which is effective to initially open the choke valve after the engine starts and runs and thereafter is effective to modulate the closing force imposed on the choke valve by a thermostat spring.

The purpose of an automatic choke on a carburetor is to automatically choke the flow of air through the carburetor to the engine and thus provide an excess of fuel for priming a cold engine during cranking, to provide an enriched mixture after engine starting in order to keep the engine running during warmup and to provide a mixture on throttle opening to obtain useful power from the engine during warm-up. Most automatic choke mechanisms include a thermostat spring as a control for exerting a force on the choke valve to urge the valve toward a closed position when the engine is stopped and the temperature sensed by the thermostat spring is in the middle seventies Fahrenheit or below. The degree of force, or bias, exerted by the thermostat spring when the choke valve is closed increases as the temperature sensed decreases or, biasing force of the thermostat spring usually varies inversely with temperatures sensed. The more bias exerted by the thermostat spring on the choke valve, the richer the mixture supplied to the engine. However, at temperatures below the middle seventies, such a thermostat spring must exert sufficient bias on the valve when the engine is being cranked to provide sufficiently rich mixture to obtain a first fire and then after engine starting the choke valve must open a minimum amount against the closing bias of the thermostat spring and must progressively open as engine speed increases. The initial choke valve opening after engine starting is effected by a suction motor connected to the choke valve which responds to engine operation to give a degree of choke valve opening often referred to as a vacuum break. As the throttle is opened to obtain power from the engine, the choke valve which is unbalanced takes up a position which is a balance between the suction forces acting to open the valve and the bias force of the thermostat spring tending to close the valve.

Since an increase in thermostat spring bias, due to a decrease in the temperataure sensed by the thermostat, will cause an increase in the choking action of the valve, which in turn will cause an increase in mixture enrichment, it becomes readily foreseeable that a spring with a biasing force to provide the engine choking requirements at starting might not meet the specifications for subsequent engine choking requirements for engine operation under load conditions.

Calibration of a carburetor automatic choke to achieve all purposes involves extensive testing of various combinations of choke valve control elements to find a combination providing a good margin of operating tolerances for the engine requirements for different conditions of engine operation. Often these engine requirements so conflict in different temperature ranges that the best combination gives merely marginal engine performance in one range or another either before or after engine start. One example of this would be a situation in which, in order to obtain a good start in one temperature range for the engine, it is necessary to select a thermostat spring with a certain minimum spring force, but this selection has a spring force in another temperature range corresponding to another engine condition, causing the engine performance to be marginal or unacceptable.

Such problems often occur, and it is one of the objects of this invention to provide a power operator for a thermostat controlled choke valve which is not only effective to give an initial vacuum break during the change in engine speed from cranking speed to running speed and prevent over enrichment of the mixture, but also a power operator which is effective thereafter in any desired degree, or range, to modulate the closing bias imposed on the choke valve by the thermostat spring.

It is still another object of the invention to provide a power operator for a thermostat controlled choke valve which is effecive to provide a variable degree of initial vacuum break during the change in engine speed from cranking to running which degree is at least a certain minimum amount of choke valve opening.

The power operator, according to this invention, is a suction motor means providing a certain minimum choke valve vacuum break after the engine starts and thereafter, a selected amount of bias opposing the closing force on the choke valve exerted by the thermostat spring control. This bias produced by the suction motor means can be exerted through any part, or all, of the remaining range of choke valve movement from the position produced on vacuum break.

The instant invention is directed to the use of a suction motor provided with a yielding connection for operating a choke valve. The yielding connection includes a limit stop for predetermining the maximum compression of a spring. This yielding connection has two distinct functions. It sets the minimum open position, or, the minimum degree of vacuum break for the choke valve produced by the operation of the suction motor, and it modulates the degree of bias of the thermostat spring tending to close the choke valve during operation of the suction motor. This modulating effect can be made available throughout the remaining range of choke valve opening movement beyond the vacuum break position.

Other objects and advantages of this invention will appear from the following detailed description which is in such clear, concise and exact terms as will enable any person skilled in the art to make and use the same when taken in conjunction with the accompanying drawings, forming a part thereof, and in which:

FIGURE 4 is an operational view schematically illustrating a position of the parts of the structure of FIGURES 1-3 after a cold start of the engine, when the temperature sensed by the thermostat is in the range of zero degrees or thereabout.

FIGURE 5 is an operational view schematically illustrating a position of the structure of FIGURES 1-3 after a cold start of the engine when the temperature sensed by the thermostat is in the seventy degree range or thereabout.

Figure 1:
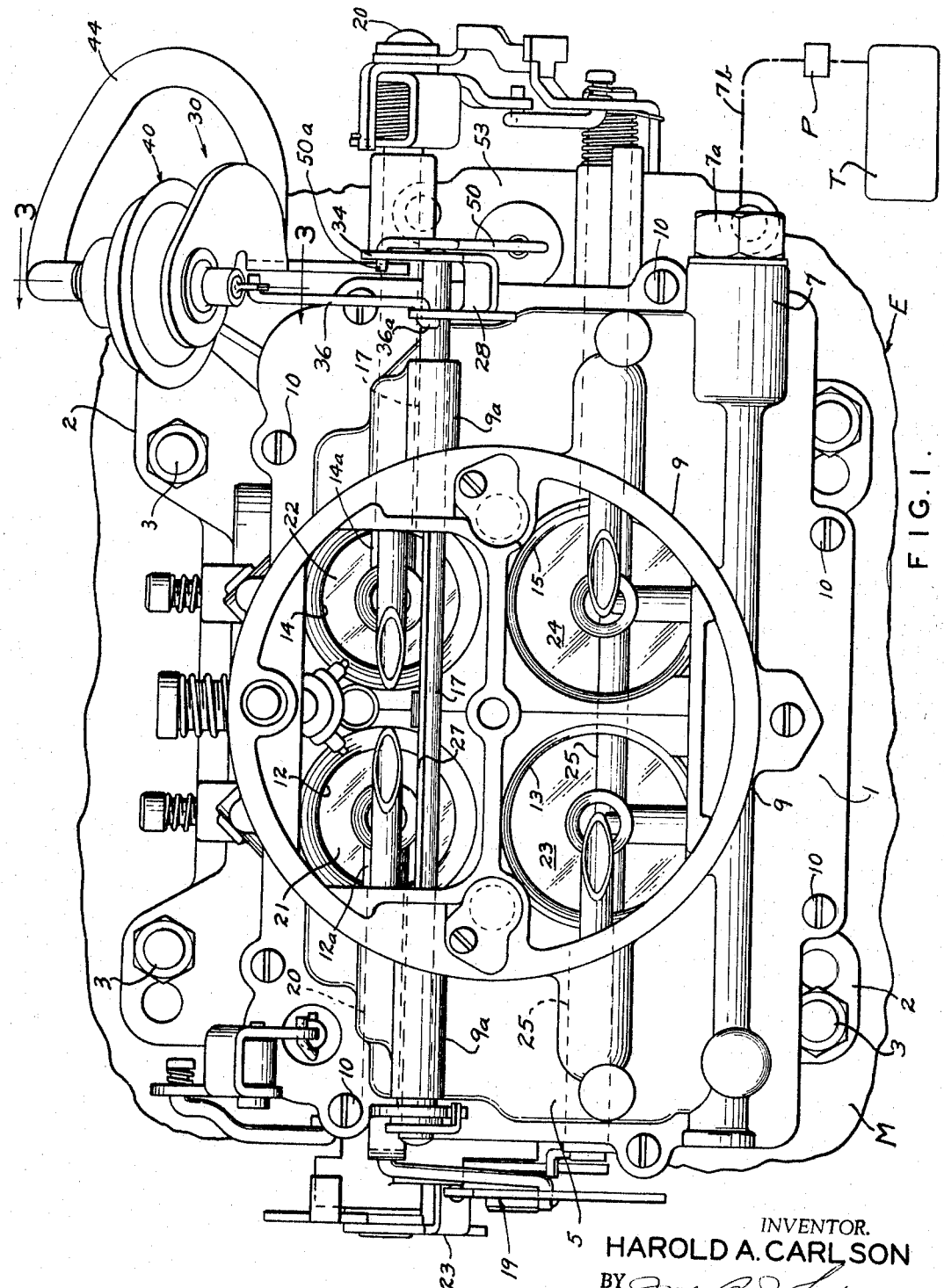
FIGURE 1 is a top plan view of one form of carburetor incorporating the invention and showing the carburetor mounted on an engine manifold.
Figure 2:
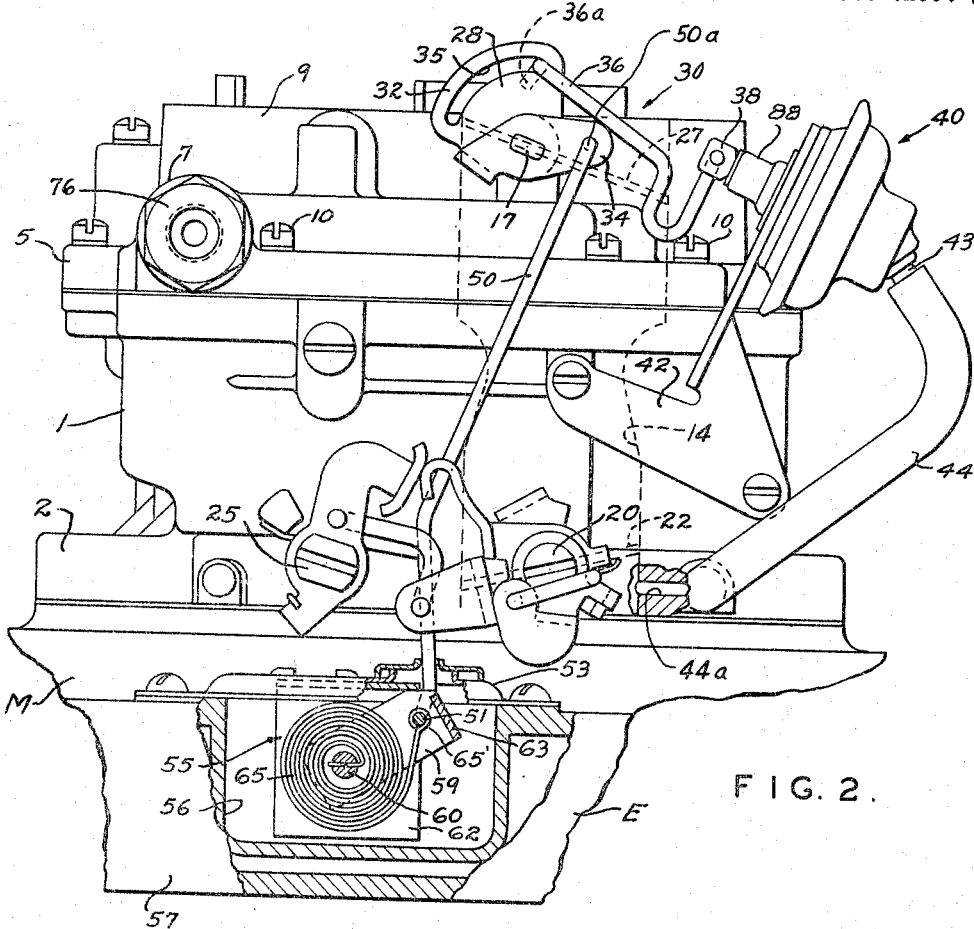
FIGURE 2 is a side elevational view of the carburetor in FIGURE 1 with parts broken away to illustrate the choke valve control.
Figure 3:
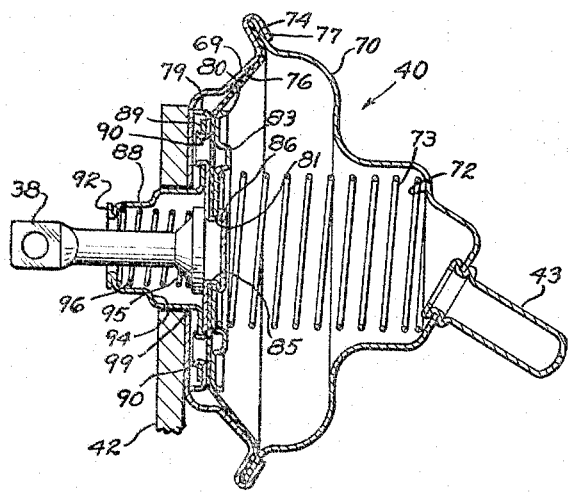
FIGURE 3 is a transverse section of the power operator in accordance with the invention and taken on the line 3—3 of FIGURE 1 looking in the direction of the arrows.

FIGURE 6 is an operational view schematically illustrating a position of the structure of FIGURES 1-3 when the temperatures sensed by the thermostat are low enough to have the choke valve operational and the engine is operating in the part throttle range; and FIGURE 7 is an operational view schematically illustrating a position of the structure of FIGURES 1–3 when the temperatures sensed by the thermostat are in the operational range for the choke valve and the engine is operating in the wide open range of throttle positions.

The carburetor to which the invention is applied in this application is of the type shown and described in the patent to L. B. Read 3,030,085 of Apr. 17, 1962. The disclosure of this patent is incorporated by reference here so as to simplify both the following description and the accompanying illustrations in the drawings. The following detailed description will be limited to only so much of the carburetor as is necessary for an understanding of the construction, application and operation of the instant invention; it being understood, of course, that this application of the invention is exemplary of others and that the instant invention is in no way restricted in application to the particular carburetor in the patent publication.

Turning now to FIGURES 1 and 2 of the drawings, the carburetor therein shown has a body 1 supported on a flange 2 which flange is apertured around its periphery to receive studs for bolting the flange to the intake manifold M of an internal combustion engine E, and as shown at 3. Secured to the top of body 1 is a float bowl cover 5 having a fuel inlet 7 and a generally circular airhorn 9. Fuel inlet 7 has an inlet fitting 7a at one end to which an inlet line 7b provides for the flow of fuel to the carburetor from a fuel tank T. A fuel pump P in line 7b provides fuel to the carburetor under pressure. The float bowl cover 5 is secured to the top of the body 1 by a plurality of screws, such as 10.

This particular carburetor is a dual multi-stage type carburetor. As viewed in FIGURE 1, there are a pair of primary mixture conduits 12 and 14 located side by side and a pair of secondary mixture conduits 13 and 15 also located side by side and all opening within the airhorn 9. The float bowl cover 5 is formed at opposite sides with spaced bearings 9a to receive the choke valve shaft 17. On one end of the choke shaft 17 is a lever and linkage system indicated generally as 19 which operates the fast idle cam mechanisms for the throttles in the primary mixture conduits. Primary throttle shaft 20 is journaled in spaced bearings in opposite sides of the carburetor and located in the flange 2. A pair of throttles 21 and 22 are fixed on the throttle shaft 20 within the primary mixture conduits and operated by lever 23 apertured for connection with a manual control. Within the secondary mixture conduits 13 and 15 are a pair of throttles 23 and 24 in turn mounted on a throttle shaft 25 also journaled in spaced bearings in opposite sides of the carburetor and located in the flange 2.

The air flow into the primary mixture conduits 12 and 14 is affected by a choke valve 27 eccentrically secured to the choke shaft 17 and located upstream of the two throttles 21 and 22. The position of the unbalanced choke valve 27 is in turn controlled through, or by, actuation of a lever 28 fixed to the end of the choke shaft 17. Rotation of lever 28 in a counterclockwise direction, as viewed in FIGURE 2, moves the choke valve 27 to closed position. Clockwise rotation of the lever 28 moves the valve 27 toward open position. The carburetor includes mechanisms, as described in the aforementioned Read patent, which lock the secondary throttles 23 and 24 closed until the choke valve 27 rotates to its wide open position. Consequently, when the choke valve 27 is within its range of closed positions, or operative positions, it creates a choking effect downstream of the valve in the primary mixture conduits to draw fuel from main fuel nozzles 12a and 14a, respectively, located therein thereby enriching the mixture delivered to the engine. The amount of suction created and, accordingly, the amount of enrichment depend upon the control mechanism for the choke valve. This control mechanism for the choke valve 27 which determines its position is indicated generally by the reference character 30 in the figures.

With particular reference to FIGURE 2, the end of the choke shaft 17 which in turn controls the position of the choke valve 27 mounts the lever 28 which has a sector arm 32 and an arm 34 superimposed and spaced from the sector 32 axially of the choke shaft 17. The sector shaped arm 32 has an arcuate slot 35 into which a bent end 36a of a link 36 is held captive. The bent end 36a of the link 36 is freely slidable between the ends of the slot 35. When the choke valve 27 is fully closed and the engine stopped, the bent end 36a of the link 36 abuts the right end of the slot 35. The slot is long enough so that the choke valve can move wide open without interference between the bent end of the link 36 and the left end of the slot 35.

The other end of the link 36 is loosely secured in an aperture in plunger 38 of a suction motor 40. A bracket 42 secured to the carburetor body 1 and the suction motor 40 mounts the motor in fixed relation with respect to the carburetor and to the carburetor body. A nipple 43 on the suction motor 40 is connected by a tube 44 with a suction passage 44a extending through the carburetor to posterior of the throttles 21 and 22, so that, when the engine is operating, manifold suction posterior of the throttles will be communicated to the suction motor 40 for power operation of the plunger 38 and the choke valve 27.

A push rod 50 has one bent end 50a projecting into the aperture in the end of the lever arm 34. Push rod 50 extends through an aperture in a cover plate 53 of a cross-over choke control device 55 mounted in a pocket 56 of the cross-over exhaust passage in the intake manifold 57 of engine E, a part of which is shown in FIGURE 2. The choke control device 55 has a carrier 59 which is U-shaped and has opposite legs of the U journaled on a stationary pin 60 supported in spaced legs of a bracket 62 secured to the cover plate 53. At the bridging portion 63 of the U-shaped carrier 59, the opposite legs are apertured to receive bent end 51 of the push rod 50. A spiral thermostat spring 65 is located between the spaced legs of the carrier 59 and has its inner end held in a slot in the pin 60 and its outer end 65′, hooked around the bent end 51 of push rod 50 so as to urge the carrier 59 and bridging portion 63 against the cover 53 when the temperatures sensed by the thermostat are in the middle range of the seventies Fahrenheit, or below, thus, tending to force the push rod 50 upward and arm 34 counterclockwise in a direction to close the choke valve 27. The parts are shown in FIGURE 2 in a position which would occur at temperatures in the range of the middle seventies or below with the engine stopped.

FIGURE 3 shows details of the power operator 40 in accordance with the invention. The power operator is a suction motor supported on the bracket 42. This suction motor has a head end casing 70 and a tail end casing 69. Within the head end casing 70 is a casing spring seat 72 for the coil spring 73. The nipple 43 is secured within an aperture surrounded by the casing spring seat 72 in the head casing 70. The head casing is generally cup-shaped and provided with an inwardly beveled rim 74 which forms a seat for a flexible rubber-like diaphragm 76. The outer edge of the diaphragm 76 is held clamped against the inwardly beveled seat 74 by an annular bead 77 surrounding the periphery of the tail end casing 69 and crimped onto the edge of the diaphragm and the exterior of the beveled seat so as to hold the diaphragm periphery on the beveled seat. On opposite sides of the diaphragm 76 are a pair of backing plates 79 and 80. Plate 80 is centrally apertured at 81 to register with an aperture of the same size centrally located in the diaphragm 76. An annular rib 83 defines a seat for the opposite end of the spring 73 on the backing plate 80. Backing plate 79 has a hollow boss 85 extending through the aperture 81 and the central aperture of the diaphragm 76. When the boss 85 is compressed, it forms a hollow rivet with flanges 86 overlapping the edge of the aperture 81 in the backing plate 80 to clamp the two backing plates 79 and 80 tightly against opposite faces of the diaphragm 76 and form a leakproof connection with the diaphragm.

Concentrically arranged with respect to the backing plates 79 and 80 is a spring housing 88 provided with an annular flange 89. The flange 89 is apertured to receive a plurality of hollow rivet-like connectors 90 struck out of the backing plate 79 and headed over to tightly secure the spring housing 88 against the outside face of the backing plate 79. Within the spring housing 88 is an annular spring seat 92 and an annular stop shoulder 94 spaced from the annular spring seat 92. On one end of the plunger 38 is telescoped within housing 88 and is provided with a flanged head 95 against which a spring 96 is seated. The opposite end of the spring rests against the annular spring seat 92 and the spring 96 urges the head 95 toward the backing plate 79. The spring 96 can have a preloading, a rate, or a resistance, any one of which will affect calibration of the automatic choke mechanism on the carburetor.

Plunger 38 can move longitudinally within the spring housing 88 between the face of the backing plate 79 and the stop shoulder 94 which is of such a diameter as to engage the head 95. Consequently, the longitudinal movement of plunger 38 is limited by positive engagement with the housing shoulder 94 or backing plate 79.

The resistance of the thermostat spring 65 to choke valve movement varies inversely with temperature. If the engine is started in a range of low temperatures, such as at zero degrees or below, and this is also the temperature sensed by thermostat spring 65, the resistance of the spring 65 to choke valve opening is near maximum, or stated another way, the bias of spring 65 in a direction closing the choke valve 27 is near maximum. At these temperatures, the engine is far below its normal operating temperature and as a result a very rich mixture will be required to start the engine and to keep it running after it starts. Accordingly, spring 65 must be selected which will have a force in this temperature range sufficient to hold the choke valve closed fairly tight against the suction of the engine at cranking speed so as to produce a fuel flow by the engine suction to give a priming mixture. A priming mixture in some instances will be equal parts of air and fuel by weight and one far too rich to keep an engine running once it starts. Any change from a priming mixture to a running mixture, after the engine reaches operating speed, requires less fuel and thus less suction on the fuel nozzles. This change is effected by the power operator 40 which will force open the choke valve against the closing bias of the thermostat spring 65. At cranking speeds the power motor will not operate, since manifold vacuum below throttles 21 and 22 is insufficient to operator motor 40. When the engine fires and begins to run, the increase in manifold vacuum causes motor 40 to operate and through the linkage of rods 38 and 36 and lever 28, motor 40 will partially open choke valve 27 against the bias of thermostat spring 65. The diaphragm 76 of suction motor 40 has a large piston area and, when the engine runs at operating speed, it provides adequate power to open the choke valve against spring bias of thermostat 65.

The degree of choke valve opening required is not great at low engine temperatures near zero degrees Fahrenheit, consequently, spring 96 is so chosen with a spring rate and preloading that its resistance is less that that of the thermostat spring 65 at the low engine temperature near zero degrees Fahrenheit. Then spring 96 yields during the initial power stroke of motor 40. As shown in FIGURE 4, stop shoulder 94 then is pulled by diaphragm 76 against plunger head 95 and the plunger 38 moves with only the terminal part of the power stroke, thus moving the choke valve to at least a minimum open position which leans out the mixture ratio sufficient from that delivered at cranking speed, to keep the engine running, at the cold temperature, once it starts.

The position of the engine and choke parts shown in FIGURE 4 are substantially those taken by these parts when the engine is idling under the extreme cold conditions. If, however, the operator decides to drive-off he presses the accelerator which manually opens the throttle valves 21 and 22 to permit a greater flow of air to the engine. This flow of air on the unbalanced choke valve 27 will cause it to open to a greater degree against the bias of the spring 65, and causes the end of rod 36 to ride in the arcuate groove 35 of the lever arm 32. The opening of the throttle valves drops the manifold vacuum to a point where it is insufficient to hold the diaphragm 76 against the housing shoulder 72 so that rod 38 moves to the left and the end of link 36 rides farther into the arcuate slot 35. Under these drive-away conditions then, the choke motor 40 does not enter into the positioning of the choke valve 27, which is positioned by the air pressure on choke 27 opposing the bias of the thermostatic spring 65.

If during the drive-away, while the engine is still cold, the throttle is suddenly opened to a wide open position as indicated in FIGURE 7, for example, the manifold vacuum drops to substantially an atmospheric value and motor 40 40 ceases to be operative. Springs 73 and 96 will expand to move the diaphragm rod 38 and linkage 36 to the left. As described above, the flow of air to the engine past the unbalanced choke valve 27 as well as the opposing bias of spring 65 will again determine the position of the air valve 27. Also, the end of link 36 will ride in the arcuate slot 35 as the choke valve opens and thus the choke motor 40 will not oppose the opening of the valve at high speeds.

As described above, engine conditions shown and indicated in FIGURE 4 are those in which the engine temperature sensed by the thermostat spring 65 are substantially around zero degrees Fahrenheit. However, as the engine warms up, the thermostatic coil 65 is heated by engine heat in the pocket 56 so that the spring 65 tends to relax and rotate in a clockwise direction as viewed in FIGURE 5, and to move the connecting rod 50 downwardly. This reduces the bias of coil 65 against the opening of choke valve 27 and the bias of coil 65 approaches the bias value of spring 96. As the temperature of the thermostatic coil 65 approaches this condition, where the bias of springs 65 and 96 are equal, spring 96 will tend to open choke valve 27 against the weakened bias of thermostat spring 65 and will raise the head 95 of plunger 38 off of the shoulder 94 of casing 88 and the rod head 95 will assume an intermediate position between. FIGURE 5 schematically shows the relative position of the several parts of the power motor 40 as well as those of the choke and choke spring 65 under these described conditions, when the engine has warmed to a temperature between 0° F. and 70° F. These positions then of spring 96 and head 95 against the bias of thermostat valve 65 will open the automatic choke valve 27 more at vacuum break during the engine starting than when coil 65 senses a temperature around 0° F. This increased opening of valve 27 tends to lean out the rich mixture required for very cold starting and provides a more optimum fuel/air and fuel mixture for the starting and running of the engine at intermediate temperatures.

As the engine warms up to a still greater degree and approaches a temperature in the seventies Fahrenheit, the thermostat spring 65 will sense this temperature of the engine and will relax to a point that its bias against the opening of the air valve 27 is less than the strength of the motor spring 96. Then, when the engine is started and running, or after the engine has been started at cold temperatures and has now warmed up to this temperature, the position of the parts of the choke and carburetor will take the positions schematically shown in FIGURE 6, in which the motor spring 96 has completely moved to its fullest extent against the bias of the thermostat spring 65 and the head 95 of the diaphragm rod 38 is pressed against the adjacent surface of the diaphragm plate 79. Thus, the vacuum break provided by the motor 40 is a maximum and the choke valve 27 is opened to its greatest amount by the motor 40 when the engine starts. Under these conditions then the engine may run at an idle condition with a maximum flow of air past the air valve as determined by the bias of spring 65 alone. Thus, at these warmer temperatures, a greater amount of air is supplied to the engine during idle than is required at the intermediate temperatures illustrated in FIGURE 5 and the extreme cold temperatures illustrated in FIGURE 4.

In accordance with the invention, the novel air motor 40 disclosed above provides a compensating action on the choke valve 27 of the carburetor which results in a varying degree of opening of the choke valve by the motor 40 depending upon the temperature sensed by the thermostat coil 65. The strength of spring 96 is thus chosen to be less than that of the thermostat coil 65 at extreme cold temperatures and to be greater than that of coil 65 at temperatures approaching the 70° Fahrenheit. The novel power motor 40 is one which can be relatively easily fabricated out of sheet metal and in which the springs 96 and 73 can be housed within a single housing of the air motor. The assembly of the parts of motor 40 is uncomplicated and can be performed by relatively unskilled operators.

I claim:
1. A carburetor device for an internal combustion engine and having a body adapted to be mounted to the intake manifold of said engine, a mixture conduit extending through said body, a movable throttle valve in said mixture conduit, a choke valve in said mixture conduit upstream of said throttle valve and mounted for movement from an open to a closed position, a vacuum motor, means forming a vacuum passage extending from said motor to said mixture conduit posterior of said throttle for providing a source of engine manifold vacuum to said suction motor, a mechanical connection between said vacuum motor and said choke valve to move said choke valve to a partially open position in response to engine vacuum posterior of said throttle, a temperature responsive spring connected to said choke valve for biasing said choke valve enclosed at temperatures below a predetermined value, said mechanical connection including an expandable link having a resistance to expansion less than the bias of said temperature responsive spring below said predetermined temperature value, and a lost motion connection between said expandable link and said choke valve to allow said choke valve to open independently of said suction motor, said expandable link including a pair of telescoping parts, one of said telescoping parts including an open tubular member (88) having one end joined to said diaphragm and movable therewith, and the other one of said telescoping parts including a shaft (38) extending therough the opening in said tubular member with one end movably positioned within said tubular member, a spring (96) having a substantially fixed resistance to expansion mounted within said tubular member and connecting said telescoping parts together for relative movement against the bias of said spring, and stop means (94) to limit relative movement of said telescoping parts to an amount less than said fixed amount of movement of said diaphragm, said shaft one end including a shaft head (95), said spring (96) being mounted between said shaft head and the other end of said tubular member, and said stop means including a portion of said tubular member intermediate said ends thereof and extending into the path of movement of said shaft head.

2. In a carburetor device as defined in claim 1 wherein said stop means includes an annular shoulder projecting inwardly from an inner wall of said tubular member to engage said shaft head and limit movement thereof.

3. In a carburetor device as defined in claim 2 wherein said annular shoulder is positioned intermediate opposed ends of said tubular member to limit movement of said head between one end of said tubular member and said annular shoulder.

References Cited by the Examiner
UNITED STATES PATENTS

| | | | |
|---|---|---|---|
| 1,891,049 | 12/1932 | Klopsteg. | |
| 2,124,778 | 7/1938 | Hunt | 261—39 |
| 2,287,326 | 6/1942 | Reeves et al. | |
| 2,646,781 | 7/1953 | Doyen | 92—84 X |
| 2,926,895 | 3/1960 | Seyfarth | 261—39 |
| 2,985,196 | 4/1961 | Brunner | 92—84 X |
| 2,997,027 | 8/1961 | Ingres | 92—84 X |
| 3,151,857 | 10/1964 | Falkenberg. | |
| 3,182,974 | 5/1965 | Hill | 261—50 X |
| 3,253,781 | 5/1966 | Scheffler | 261—39 X |
| 3,262,683 | 7/1966 | Ball et al. | 261—39 X |

HARRY B. THORNTON, *Primary Examiner.*

T. R. MILES, *Assistant Examiner.*